United States Patent
Singh et al.

(10) Patent No.: US 10,540,136 B2
(45) Date of Patent: Jan. 21, 2020

(54) FASTER FRAME BUFFER RENDERING OVER A NETWORK

(71) Applicant: DELL PRODUCTS, L.P., Round Rock, TX (US)

(72) Inventors: Ankit Singh, Bangalore (IN); Rohitkumar Arehalli, Bangalore (IN); Aniruddha Suresh Herekar, Bangalore (IN); Sreenivasula Reddy G, Proddatur (IN); Guru Prasad Yadav, Proddatur (IN)

(73) Assignee: Dell Products, L.P., Round Rock, TX (US)

( * ) Notice: Subject to any disclaimer, the term of this patent is extended or adjusted under 35 U.S.C. 154(b) by 559 days.

(21) Appl. No.: 15/163,002

(22) Filed: May 24, 2016

(65) Prior Publication Data

US 2017/0344331 A1 Nov. 30, 2017

(51) Int. Cl.
*G06F 3/14* (2006.01)

(52) U.S. Cl.
CPC .................. *G06F 3/1454* (2013.01)

(58) Field of Classification Search
CPC combination set(s) only.
See application file for complete search history.

(56) References Cited

U.S. PATENT DOCUMENTS

| | | | |
|---|---|---|---|
| 5,909,225 A | 6/1999 | Schinnerer et al. | |
| 7,019,752 B1 * | 3/2006 | Paquette | G06F 3/1438 345/530 |
| 7,196,710 B1 * | 3/2007 | Fouladi | G06F 3/14 345/501 |
| 7,576,748 B2 * | 8/2009 | Van Hook | G06T 15/005 345/545 |
| 7,949,705 B1 * | 5/2011 | Smith | H04L 67/08 345/536 |
| 8,441,484 B2 * | 5/2013 | Ballantyne | G06T 11/206 345/440 |
| 8,823,721 B2 * | 9/2014 | Vasquez | G09G 5/003 345/531 |
| 8,949,320 B2 * | 2/2015 | Luxenberg | H04L 67/2842 709/203 |
| 9,294,553 B1 * | 3/2016 | Vaswani | H04L 67/2847 |
| 2002/0015042 A1 * | 2/2002 | Robotham | G06F 3/14 345/581 |
| 2005/0108300 A1 * | 5/2005 | Findleton | G06F 12/0815 |

(Continued)

*Primary Examiner* — Hien L Duong
(74) *Attorney, Agent, or Firm* — Isidore PLLC

(57) ABSTRACT

A method and an information handling system (IHS) renders a graphical user interface (GUI) from a remote device using a local storage. An interface controller detects a first event used to initiate access to the GUI at the remote device. The controller requests GUI frame buffer data corresponding to the first event, and GUI change data from the remote device. The GUI change data correspond to respective events that can trigger changes to the GUI. In response to receiving the requested data, the controller provides a first locally-rendered GUI using the GUI frame buffer data. The controller stores the GUI change data in local storage. The controller then detects a second event/interaction via the first locally-rendered GUI and retrieves from local storage a relevant portion of the GUI change data. The controller provides an updated locally-rendered GUI using the relevant portion of GUI change data.

20 Claims, 10 Drawing Sheets

(56) References Cited

U.S. PATENT DOCUMENTS

| | | | | |
|---|---|---|---|---|
| 2006/0168537 A1* | 7/2006 | Hochmuth | G06F 3/1454 | 715/778 |
| 2008/0120553 A1* | 5/2008 | Bergman | H04L 41/22 | 715/740 |
| 2009/0080523 A1* | 3/2009 | McDowell | H04N 19/51 | 375/240.15 |
| 2009/0097751 A1* | 4/2009 | McDowell | G06F 15/177 | 382/181 |
| 2009/0100125 A1* | 4/2009 | McDowell | H04L 65/607 | 709/203 |
| 2009/0307428 A1* | 12/2009 | Schmieder | G06F 3/1462 | 711/118 |
| 2010/0017526 A1* | 1/2010 | Jagannath | H04L 12/1859 | 709/229 |
| 2010/0138476 A1* | 6/2010 | Gokaraju | H04L 29/00 | 709/203 |
| 2010/0306401 A1* | 12/2010 | Gilson | H04N 5/765 | 709/231 |
| 2010/0332654 A1* | 12/2010 | Bose | G06F 3/1415 | 709/224 |
| 2011/0179106 A1* | 7/2011 | Hulse | H04N 21/2143 | 709/203 |
| 2013/0024543 A1* | 1/2013 | Thomas | H04L 67/02 | 709/217 |
| 2013/0054679 A1* | 2/2013 | Jooste | G06F 9/54 | 709/203 |
| 2013/0136125 A1* | 5/2013 | Jain | H04L 47/38 | 370/392 |
| 2013/0268614 A1* | 10/2013 | Bose | G06F 15/167 | 709/213 |
| 2013/0283171 A1* | 10/2013 | Schick | G06F 3/0481 | 715/733 |
| 2014/0015842 A1* | 1/2014 | Sebesta | G06F 3/1431 | 345/541 |
| 2014/0089812 A1* | 3/2014 | Matsui | G06F 17/30873 | 715/738 |
| 2014/0189035 A1* | 7/2014 | Chen | H04L 67/2842 | 709/213 |
| 2014/0195675 A1* | 7/2014 | Silver | H04L 65/1083 | 709/224 |
| 2014/0226901 A1* | 8/2014 | Spracklen | G06F 9/451 | 382/167 |
| 2014/0253563 A1* | 9/2014 | Koneru | G06T 1/60 | 345/501 |
| 2014/0304326 A1* | 10/2014 | Wesley | H04L 67/10 | 709/203 |
| 2014/0325372 A1* | 10/2014 | Spracklen | G06F 9/452 | 715/740 |
| 2014/0372568 A1* | 12/2014 | Clark | H04L 65/602 | 709/219 |
| 2016/0246787 A1* | 8/2016 | Zhang | G06F 17/3028 | |

* cited by examiner

FASTER FRAME BUFFER RENDERING OVER A NETWORK

BACKGROUND

1. Technical Field

The present disclosure generally relates to information handling systems (IHS) and in particular to frame buffer rendering within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used to access and process data obtained from remote devices. When using an IHS to access a graphical user interface (GUI) over a remote network (such as through virtual network computing (VNC) or remote desktop), the frame buffer data gets transferred for every simple GUI action. The actions may include background or foreground color change when a mouse is moved over/on a widget. The data required for rendering the GUI for this type of events is relatively small in size. However, the process involved in obtaining a small amount of frame buffer data from a remote server and rendering the data on a client is time consuming. This time consuming process slows down the GUI operations, providing a negative customer/user experience. For example, when a user moves the mouse pointer over a button on a screen that is being accessed remotely (e.g., a virtual console on a Dell Power-Edge™ server), an event occurs for button foreground change over which the mouse pointer is placed. This event is sent to the remote device, which in turn responds with the frame buffer data required for rendering the color change. If the network is slow, the user will experience slowness or glitches in the rendering of GUI actions.

BRIEF SUMMARY

Disclosed are a method and an information handling system (IHS) that renders a graphical user interface (GUI) from a remote device using a local storage. An interface controller detects a first event used to initiate access to the GUI at the remote device. The controller requests GUI frame buffer data corresponding to the first event, and GUI change data from the remote device. The GUI change data correspond to all respective events that can trigger changes to the GUI. In response to receiving the requested data, the controller provides a first locally-rendered GUI using the GUI frame buffer data. The controller stores the GUI change data in local storage. The controller then detects a second event/interaction via the first locally-rendered GUI and retrieves, from local storage, a relevant portion of the GUI change data. The controller provides an updated locally-rendered GUI using the relevant portion of GUI change data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
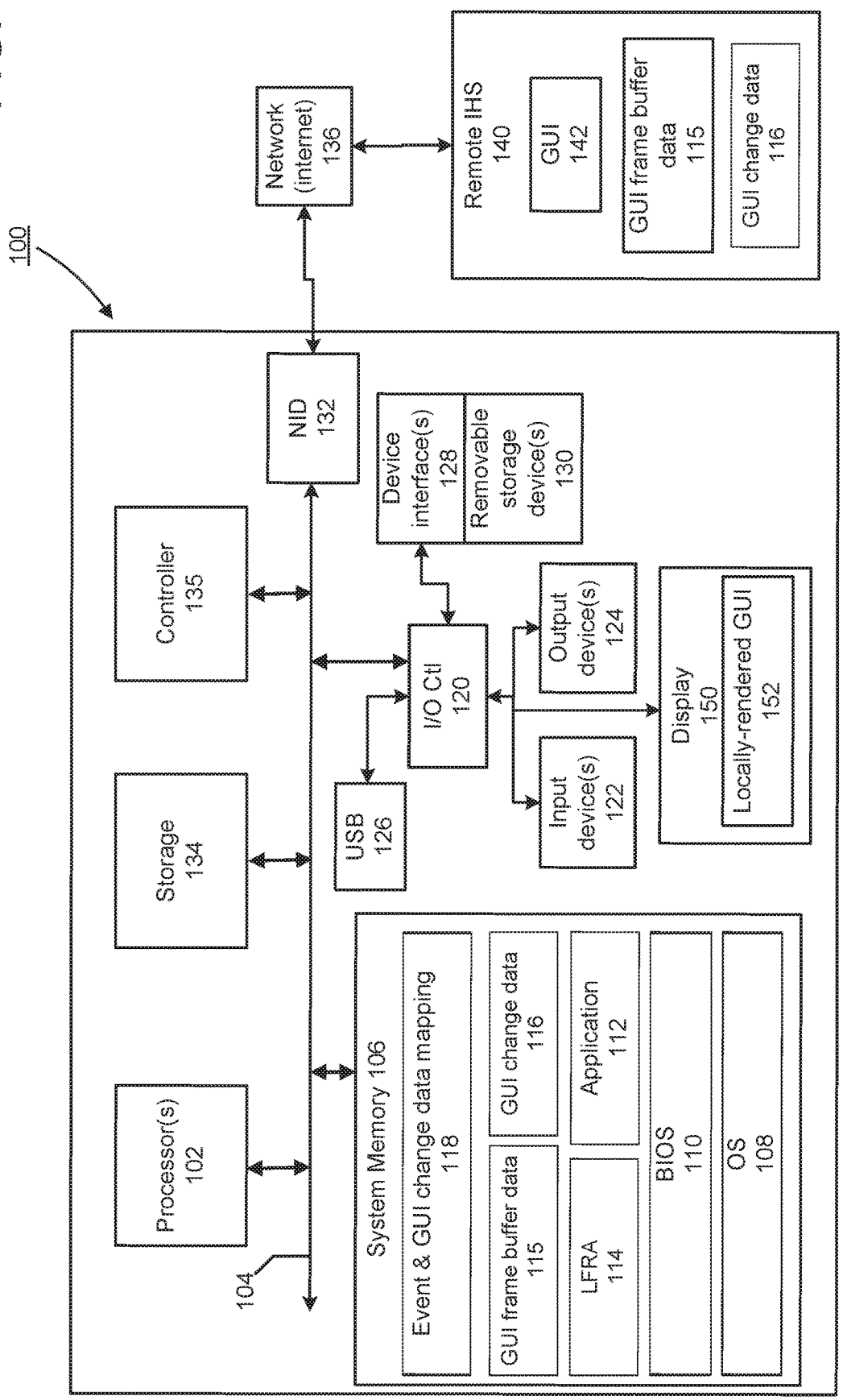
FIG. 1 illustrates an example information handling system (IHS) within which various aspects of the disclosure can be implemented, according to one or more embodiments.

The illustrative embodiments provide a method and an information handling system (IHS) that renders a graphical user interface (GUI) from a remote device using a local storage. An interface controller detects a first event used to initiate access to the GUI at the remote device. The controller requests GUI frame buffer data corresponding to the first event, and GUI change data from the remote device. The GUI change data correspond to respective events that can trigger changes to the GUI. In response to receiving the requested data, the controller provides a first locally-rendered GUI using the GUI frame buffer data. The controller stores the GUI change data in local storage. The controller then detects a second event/interaction via the first locally-rendered GUI and retrieves from local storage a relevant portion of the GUI change data. The controller provides an updated locally-rendered GUI using the relevant portion of GUI change data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the IHS are not intended to be exhaustive, but rather are representative to highlight some of the components that are utilized to implement certain of the described embodiments. For example, different configurations of an IHS may be provided, containing other devices/components, which may be used in addition to, or in place of, the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including operating system (O/S) 108, Basic Input/Output System (BIOS) (110), application(s) 112 and firmware (not separately shown). In one or more embodiments, BIOS 110 comprises additional functionality associated with unified extensible firmware interface (UEFI), and is thus illustrated as and can be more completely referred to as BIOS/UEFI 110 in these embodiments. In addition, system memory 106 includes local frame buffer rendering agent (LFRA) 114, GUI frame buffer data 115 and GUI change data 116 and event & GUI change data mapping 118. The various software and/or firmware modules have varying functionality when their corresponding program code is executed by processor(s) 102, or by other processing devices within IHS 100.

IHS 100 further includes one or more input/output (I/O) controllers 120, which support connection to, and processing of, signals from one or more connected input device(s) 122, such as a keyboard, mouse, touch screen, or microphone. I/O controllers 120 also support connection to, and forwarding of, output signals to one or more connected output device(s)

124, such as a monitor or display device or audio speaker(s). In one embodiment, I/O controller 120 supports a presentation on display 150 of a GUI illustrated as locally-rendered GUI 152 which corresponds to GUI frame buffer data 115. In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as I²C, SMBus, and peripheral component interconnect (PCI) buses.

IHS 100 further comprises interface controller 135, which uses LFRA 114 to support/provide frame buffer rendering using frame buffer data from a local storage (e.g., storage 135). IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136. Remote IHS 140 is an example server that includes/provides targeted GUI 142, GUI frame buffer data 115, and GUI change data 116.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
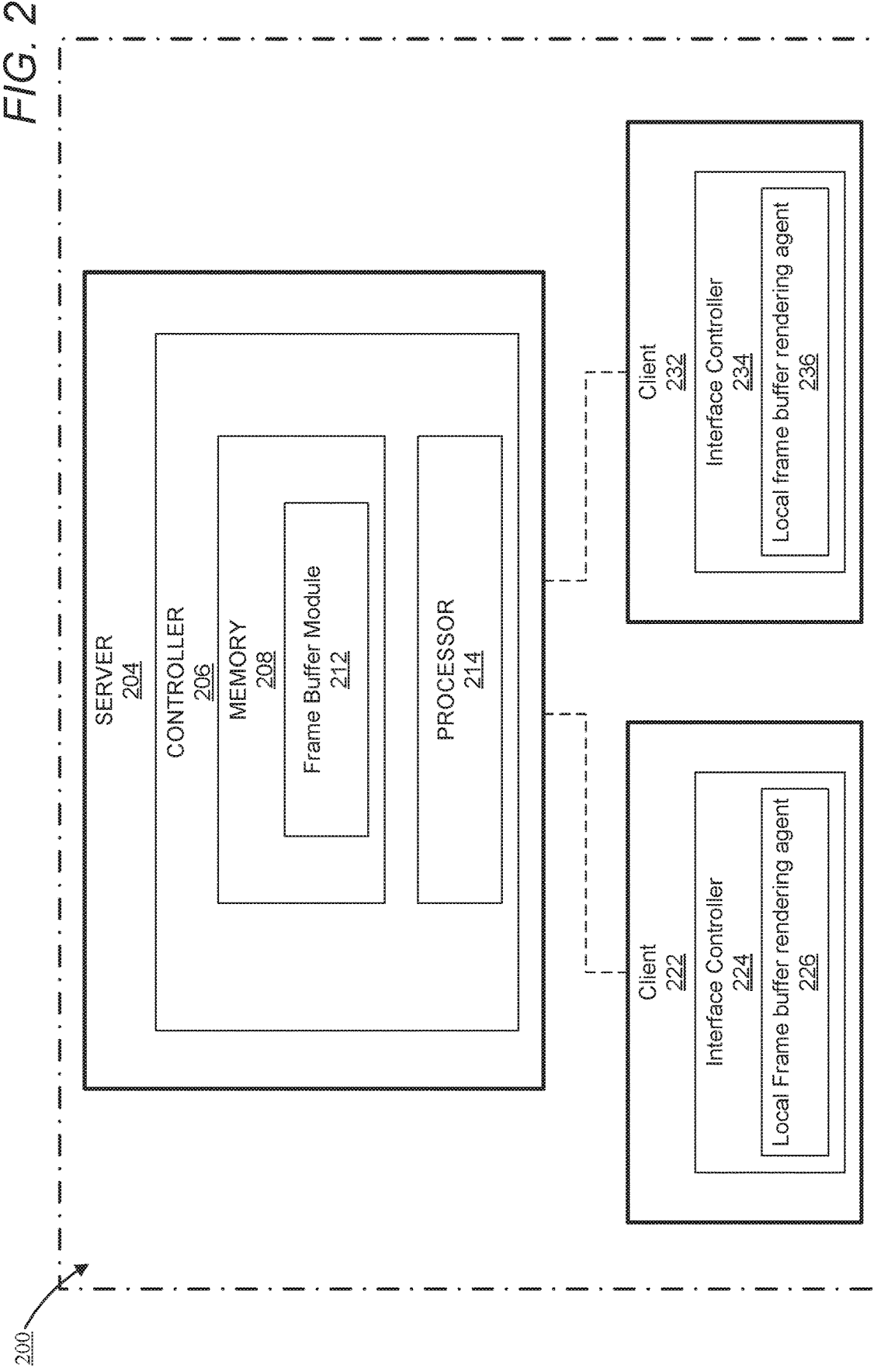
FIG. 2 depicts a block diagram illustration of multiple clients communicating with a remote server to access frame buffer data, according to one or more embodiments.

FIG. 2 depicts a block diagram illustration of multiple clients communicating with a remote server to access frame buffer data, according to one or more embodiments. Environment 200 comprises server 204, first client 222 and second client 232, which can both be similarly configured to IHS 100 (FIG. 1). Server 204 further comprises controller 206 having memory 208 and processor 214. Memory 208 includes frame buffering module 212. First and second clients 222 and 232 comprise interface controllers 224 and 234, respectively.

According to one or more aspects, a client (e.g., first client 222) connects to a server (e.g., server 204) and requests frame buffer data associated with a GUI (e.g., GUI 142) that the client seeks to access. In one or more implementations, the client is able to connect to the server using a network socket connection that is established via a transmission control protocol (TCP) or a uniform data protocol (UDP). The network socket connection represents a pre-defined access path by which the client is able to connect to the server.

According to one or more related aspects, first client 222 and second client 232 are virtual network computing (VNC) clients that are connected to server 204 configured as a VNC server. According to one or more aspects, the VNC is a graphical desktop sharing system that uses the enhanced Remote Frame Buffer protocol (RFB) to enable client-server communication. The enhanced RFB is further described in FIG. 3.

According to other aspects, the client can access the remote server via a universal resource locator (URL) and/or a hypertext link. Alternatively, the client can access the server by executing a local application that is associated with an application GUI (located on the server) that the user wishes to access.

Interface controller 224 comprises local frame buffer rendering agent (LFRA) 226. LFRA 226 supports frame buffer servicing via local storage. Using LFRA 226, interface controller detects a first event corresponding to a first interaction which is used to initiate access to a graphical user interface (GUI) (e.g., GUI 142 of FIG. 1) located at a remote device and/or server, such as server 204, having one or more application GUIs. Interface controller 224 requests GUI frame buffer data and a first set of GUI change data from the remote device (e.g., server 204). The GUI frame buffer data corresponds to the first event, and the first set of GUI change data corresponds to GUI changes that can be initiated by interaction with a locally rendered GUI corresponding to the targeted GUI.

Interface controller 224 identifies an event in response to interactions received via an input device. The event is identifiable by event information that identifies event attributes including, but not limited to, one or more of: (i) an event type; (ii) a corresponding x-axis and y-axis position; (iii) a targeted control area; (iv) a targeted widget; and (v) an event mask for a targeted control widget. Interface controller 224 retrieves, from local storage, a portion of GUI change data corresponding to the event information.

According to one or more aspects, interface controller 224 is able to detect interaction events associated with changes within the locally-rendered GUI to one or more of: (i) a foreground; (ii) a background; (iii) a control widget and (iv) a color corresponding to a targeted region. It is appreciated that, in other embodiments, the interaction events can include additional events in addition to those described herein.

Interface controller 224 (i) receives the requested GUI frame buffer data from remote device/server 204, (ii) provides, using the GUI frame buffer data, a first locally-rendered GUI corresponding to the targeted GUI (e.g., targeted GUI 142 of FIG. 1), and (iii) stores, in local storage (e.g., memory 106 or storage 134 of FIG. 1), the first set of change data (e.g., GUI change data 116 of FIG. 1) received from the remote device. In addition, interface controller 224 stores pre-established mapping data of associations/links established between specific event data and respective portions of the first set of GUI change data.

In one or more embodiments, when establishing a call with client 222, server 204 queries client 222 to determine whether client 222 has the capability to support frame buffer rendering via a local storage. As a result of information obtained from the query, server 204 is able to communicate with client 222 according to the client's capability.

In one or more related embodiments, interface controller 224 requests, from the remote device/server 204, GUI frame buffer data (e.g., GUI frame buffer data 115 of FIG. 1) without explicitly requesting the GUI change data (e.g., GUI change data 116 of FIG. 1). According to one aspect, the remote device provides both GUI frame buffer data 115 and GUI change data 116 if it is determined that the requesting client (e.g., client 222) has the ability to perform GUI rendering using a local storage.

According to one or more aspects, the first interaction, which is detected by interface controller 224, is provided by a first client or user that is included within a multi-client session in which the GUI is shared among multiple clients respectively using locally rendered GUIs. Each of the multiple clients receives, from the remote device, a respective copy of the GUI frame buffer data that is used to provide each client with a respective, locally-rendered GUI.

In one or more related aspects, interface controller 224 detects and/or receives an indication of a second (client) interaction (e.g., a mouse over interaction or a keyboard input) at a locally-rendered GUI, and provides an updated locally-rendered GUI. Interface controller 224 provides an update from a previous locally-rendered GUI to the updated locally-rendered GUI by using a first portion of the first set of change data from local storage. The update is triggered by the second interaction. Interface controller 224 identifies the first portion of GUI change data used to provide the update by comparing event information associated with the second interaction with stored event information from the pre-established mapping data to identify matching event data. Interface controller 224 is then able to retrieve the relevant/first portion of the first set of GUI change data.

According to one or more aspects, interface controller 224 determines that the second interaction is provided by the first client (e.g., client 222) via the first locally-rendered GUI and transmits event data corresponding to the second interaction to remote device/server 204. The remote device uses the event data provided by the first client to provide updates to locally-rendered GUIs of other respective clients including the second client (e.g., client 232) In one embodiment, the multiple clients can comprise a first group of clients that supports frame buffer servicing via respective local storages and a second group of clients that do not support frame buffer servicing via a local storage. With this embodiment, in response to receiving the event data that was transmitted, the remote device forwards (i) the received event data to remaining clients of the first group of clients and (ii) corresponding GUI change data to the second group of clients, in order to provide a respective updated, locally-rendered GUI at each of the other clients, which can include client 232.

According to one aspect, the second interaction is provided via a second locally-rendered GUI by a second client that does not support frame buffer servicing via a local storage. The second client requests, from the remote device, GUI change data corresponding to the second user interaction. In response to receiving the request for GUI change data from the second client, the remote device forwards (i) event data to a first group of clients that support frame buffer servicing via a local storage and (ii) corresponding GUI change data to remaining clients of the second group of clients that do not support frame buffer servicing via a local storage. The remote device forwards the two types of data (i.e., the event data and the GUI change data) in order to provide a respective updated locally rendered GUI at each of the other clients. Interface controller 224 (and the interface controller for each of the first group of clients that support frame buffer servicing) receives the forwarded event data and uses the forwarded event data to retrieve a relevant portion of the first set of event data to provide a corresponding, updated locally-rendered GUI.

According to one embodiment, interface controller 224 receives, from the remote device, a query to determine whether the first client supports frame buffer servicing via a local storage. For example, in multi-client sessions, the remote device sends queries to the multiple clients to determine which clients support frame buffer servicing via a local storage. In at least one embodiment, this check is performed when the client initially requests a copy of the GUI frame buffer data. In addition, the remote device classifies clients within a respective one of (i) a first group of clients that support frame buffer servicing via a local storage and (ii) a second group of clients that do not support frame buffer servicing via a local storage.

Figure 3:
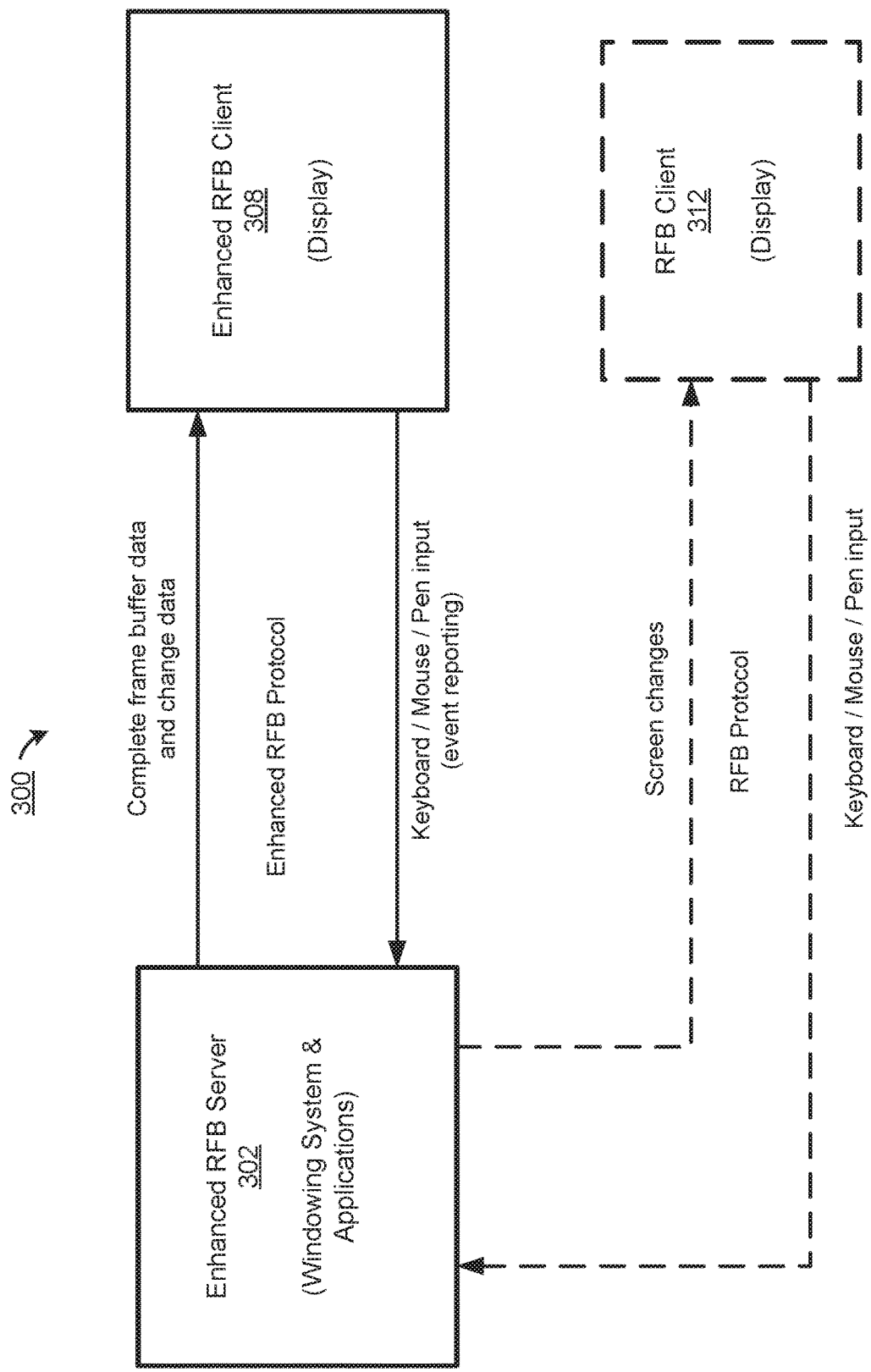
FIG. 3 is a block diagram illustrating an enhanced remote frame buffer (RFB) protocol message flow between an RFB server and an RFB client, according to one or more embodiments.

FIG. 3 is a block diagram of an enhanced remote frame buffer (RFB) system 300 illustrating an enhanced RFB protocol message flow between an enhanced RFB server and an enhanced RFB client, according to one or more embodiments. Enhanced RFB system 300 comprises enhanced RFB server 302 (which can also be represented by server 204 of FIG. 2) and enhanced RFB client 308 (which can also be represented by client 222 of FIG. 2). Enhanced RFB server 302 and enhanced RFB client 308 communicate using the RFB protocol which is used to provide enhanced RFB client 308 with remote access to application GUIs presented or available on RFB server 302. The enhanced RFB protocol operates to support frame buffer rendering of a screen image corresponding to an application GUI.

Interface controller 224 enables enhanced RFB client 308 to submit requests for GUI frame buffer data for (i) an initial, locally-rendered GUI and (ii) GUI change data, which supports all associated GUI changes that can be triggered by interaction with the locally-rendered GUI. Additionally, interface controller 224 enables enhanced RFB client 308 to update a locally-rendered GUI using locally stored GUI change data, and enables enhanced RFB client 308 to report an event without having to provide any further requests for GUI change data. Interface controller 224 sends event information to enhanced RFB server 302, which enhanced RFB server 302 uses in multi-client (sharing) sessions to trigger GUI updates at other clients.

An initial interaction between enhanced RFB client 308 and enhanced RFB server 302 involves a negotiation of the format and encoding with which pixel data will be sent. The display side of the RFB protocol involves placing a rectangle of pixel data at a given x-axis position (i.e., horizontal axis screen position) and y-axis position (i.e., horizontal axis screen position), and providing a frame buffer update by using a sequence of rectangles that collectively provides changing sets of pixel data. The frame buffer update represents a change from one valid frame buffer state to another.

The input side of the protocol is based on a standard workstation model of a keyboard and multi-button pointing device corresponding to a client (e.g., enhanced RFB client 308). Using interface controller 224, an input event is sent to the server by the client during an initial interaction when GUI data is initially requested. In addition, using interface controller 224, input events are sent to the server by the client during subsequent interactions when the client participates in a multi-client sharing session. Input events can occur whenever the user presses a key or pointer button, or whenever the pointing device is moved. Interface controller 224 enables input events to be communicated between clients and servers over a network.

The frame buffer data contains the x- and y-coordinates, which provide a corner position in the frame buffer from which the client can copy the corresponding rectangle of pixel data. Updates to a locally-rendered GUI or frame-buffer can occur for a number of interaction events such as events in which a user moves a cursor on GUI buttons, highlights foreground of controls (or views) on a window across the screen, and/or scrolls the contents of a window.

According to one or more aspects, enhanced RFB server 302 also communicates with (non-enhanced) RFB client 312. As is further described herein, RFB client 312 is a member of a group of clients that do not support frame buffer servicing via a local storage.

According to one aspect, GUI rendering support provided by the enhanced RFB protocol can be applied to substantially all windowing systems, including Microsoft Windows™-based interfaces, and applications.

Figure 4:
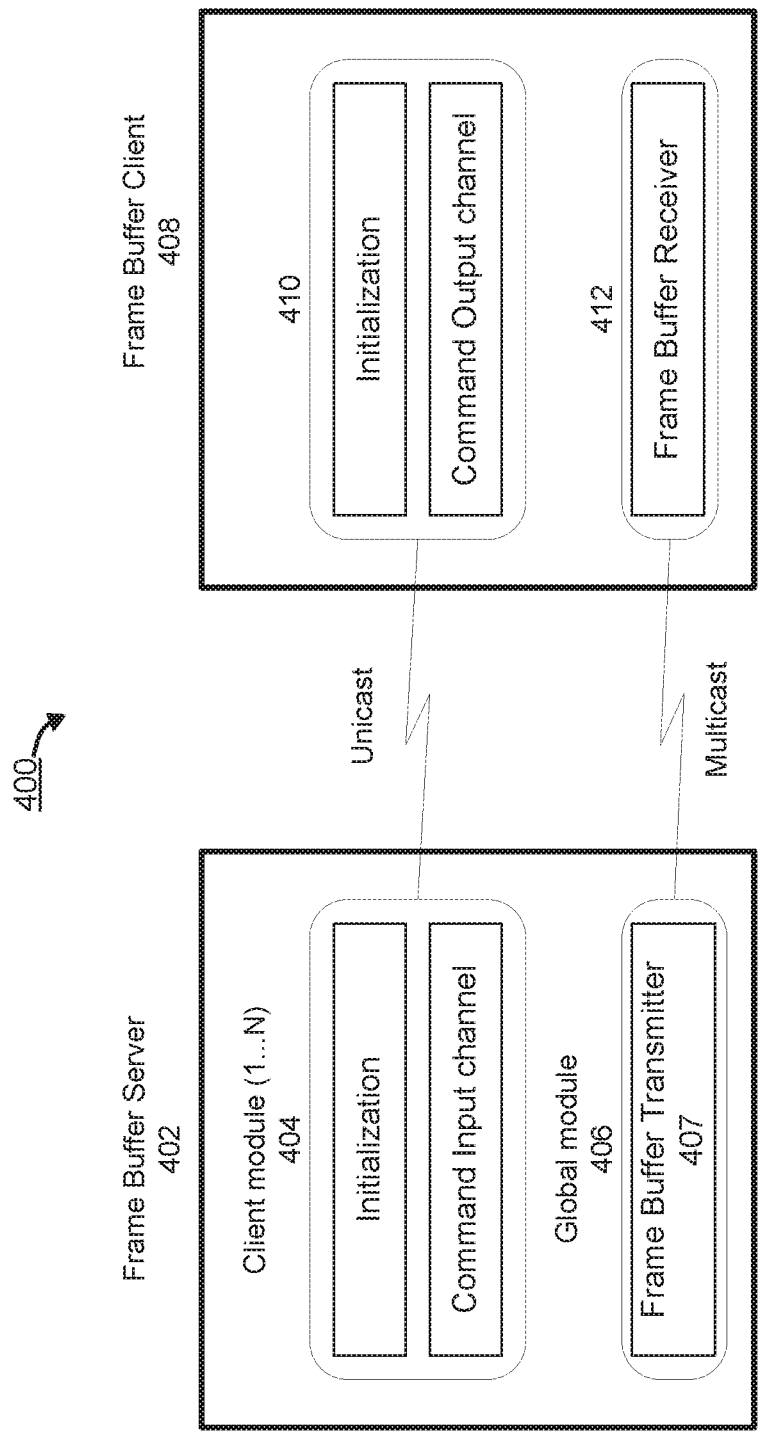
FIG. 4 is block diagram illustrating a client and server frame buffer architecture, according to one embodiment.

FIG. 4 is block diagram illustrating a client and server frame buffer architecture. Architecture 400 comprises frame buffer server 402 and frame buffer client 408. Frame buffer server 402 comprises client module 404 having initialization component and command input channel component, and global module 406 having frame buffer transmitter component 407. Frame buffer client 408 comprises initialization and command output channel components 410 and frame buffer receiver component 412.

Frame buffer server 402 and each frame buffer client (e.g., frame buffer client 408) respectively use initialization components to perform initialization procedures using uni-cast messages. Messages and/or frame buffer data are sent on channels using command input channel and command output channel. Frame buffer server 402 uses frame buffer transmitter to provide multi-cast frame buffer transmission to distribute frame buffers to clients having frame buffer receivers.

The server (e.g., server 402) is able to establish multi-client (sharing) sessions in which one or more clients (i.e., a first set of clients) support frame buffer rendering via a local storage and other clients (i.e., a second set of clients) do not support frame buffer rendering via a local storage. However, the second set of clients can receive frame buffer change data directly from the remote device in response to the server (e.g., server 402) receiving event data directly associated with a respective GUI update.

When establishing calls with the different clients, the server queries the clients (e.g., client 408) to determine whether a respective client has the capability to support frame buffer rendering via a local storage. As a result, the server (e.g., server 402) is able to communicate with the different clients according to the clients respective capabilities.

For example, server determines that client C1 (e.g., client 222 of FIG. 2) supports frame buffer rendering via a local storage and client C2 (e.g., client 232 of FIG. 2) does not support frame buffer rendering via a local storage. When interface controller of client C1 makes changes to a widget on client C1, interface controller sends the event of changes to the server. Server then communicates the event change to the other clients, i.e., C2, depending on the respective capabilities. As a result of determining that client C2 does not support frame buffer rendering via a local storage, server transfers to client C2 the change data corresponding to the GUI changes in C1.

If changes are initiated in client C2 (e.g., client 232 of FIG. 2) by an interaction event, client C2 (e.g., client 232 of FIG. 2) sends event data with a request for corresponding change data to the server. The server sends the change data to the client C2 (e.g., client 232 of FIG. 2). However, the server sends only the event data for the changes required to client C1 (e.g., client 222 of FIG. 2) as a result of client C1's capability. Because client C1 supports frame buffer rendering via a local storage, client C1 recognizes the event and makes the required changes.

Figure 5:
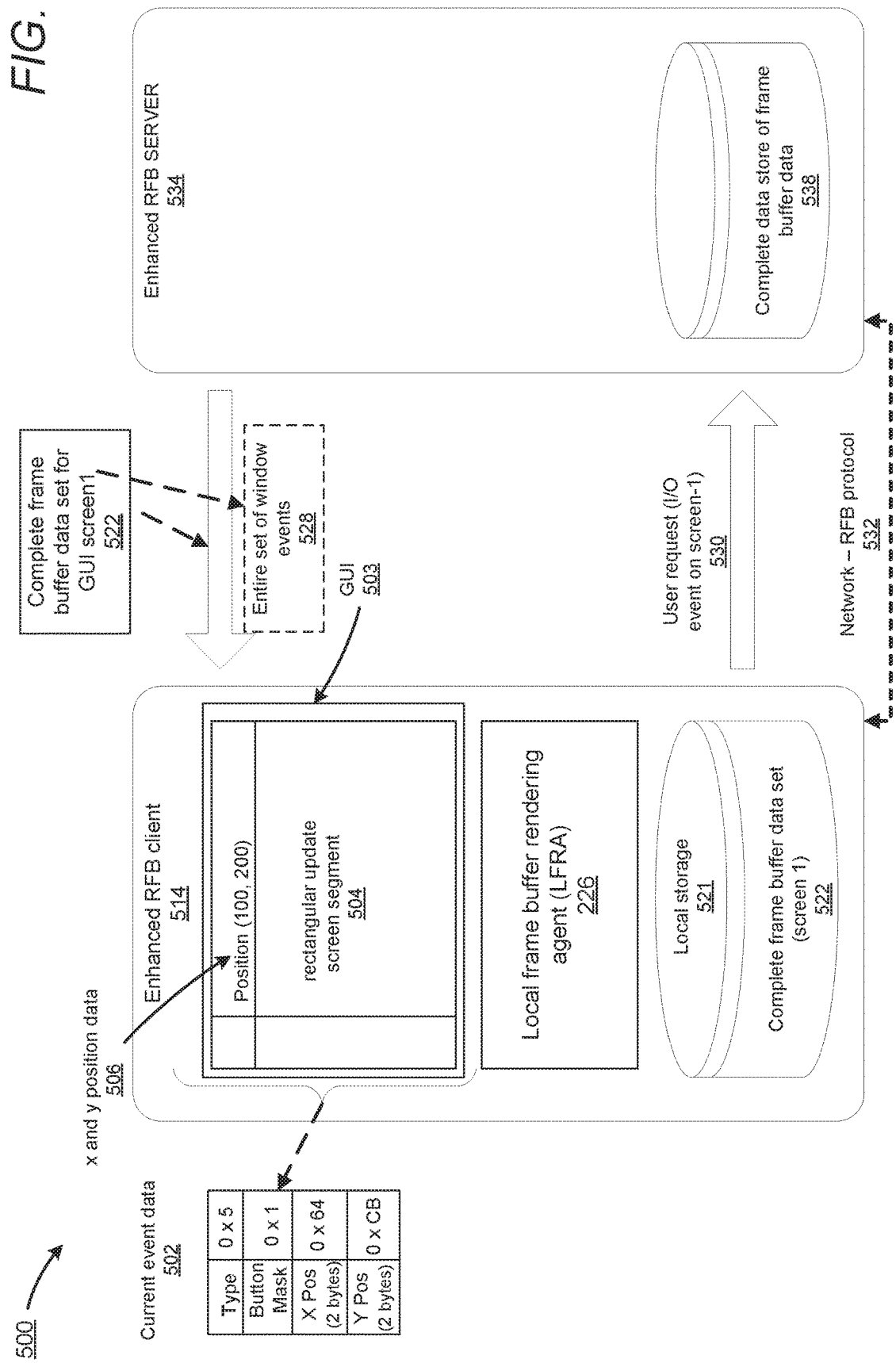
FIG. 5 is a block diagram illustrating GUI rendering at a client having locally stored GUI change data, according to one or more embodiments.

FIG. 5 is a block diagram of an environment 500 illustrating GUI rendering at a client having locally stored GUI change data. Environment 500 comprises enhanced RFB client 514 and enhanced RFB server 534. RFB client 514 comprises GUI 503, which includes rectangular update screen segment 504. Rectangular update screen segment 504 has an upper left corner position identified by example x-y position data 506, which is provided within a corresponding frame buffer data. As illustrated by example x-y position data 506, the x-axis position is 100 while the y-axis position is 200. RFB client 514 also comprises local frame buffer rendering agent (LFRA) 226 and stored, current screen frame buffer data (screen1) 522. Also illustrated is current event data 502, which is used to identify GUI change data corresponding to rectangular update screen segment 504. In the example of FIG. 5, current event data 502 identifies a detected event using: (i) an event type identifier of 0x5 (i.e., a hexadecimal value); (ii) a button mask identified as 0x1 for a button corresponding to the detected event and event type; (iii) an X position identified as 0x64 (i.e., a hexadecimal value for a decimal value of approximately 100); and (iv) a Y position identified as 0xCB (i.e., a hexadecimal value for a decimal value of approximately 200).

In response to detecting a user interaction and/or event used for initiating access to a GUI such as screen1 (e.g., GUI 142 of FIG. 1) on RFB server 534, RFB client 514, via interface controller (e.g., interface controller 224 of FIG. 2), sends user request 530 for GUI frame buffer data and GUI change data to RFB server 534. RFB server 534 retrieves GUI frame buffer data and GUI change data stored at server 534 and sends the retrieved GUI frame buffer data and GUI change data corresponding to an entire set of associated events to RFB client 514. The retrieved GUI frame buffer data and GUI change data is collectively illustrated as "complete frame buffer data set for GUI screen1" 522. Entire set of associated events 528 is included within complete frame buffer data set 522. In one or more embodiments, RFB client 514 and RFB server 534 communicate over network 532 using the RFB protocol.

An interface controller, such as interface controller 224 provides a first locally-rendered GUI corresponding to the targeted GUI using the GUI frame buffer data. The interface controller stores the GUI frame buffer data and the GUI change data in local storage. As described above, the GUI frame buffer data and GUI change data for an entire set of associated events are collectively illustrated by "complete frame buffer data set (screen 1)" 522 which is located in storage 521. Local storage 521 is initially created when window or screen is rendered on the display, on the request from the client.

Interface controller 224 detects or identifies a second event in response to interactions with the locally-rendered GUI. That is, interface controller 224 detects interactions received via a respective input device. For example, interface controller 224 identifies the second event by current event data/information 502. Interface controller, using LFRA 226, retrieves, from local storage, a portion of GUI change data that corresponds to the event information.

According to one or more aspects, interface controller 224 detects input/output (I/O) events/interactions associated with changes within the locally-rendered GUI (e.g., GUI 503). These changes can be one or more of: (i) a foreground; (ii) a background; (iii) a control widget, and (iv) a color corresponding to a targeted region, in one embodiment. For example, some I/O events include mouse over operations, scroll bar operations, and/or checkbox changes. The transient states of the frame buffer like foreground color update during a mouse over events, and the GUI changes during button press events can be serviced from a local data store via Local Frame buffer Rendering Agent (LFRA) 226.

The local data store is initially created when a window or screen is rendered on the display, upon the request from the client, and only the event information is sent back to the server for multi-client session handling. If a new client joins the session after the event information is received by the server, the server provides to the newly joined client the current window frame buffer, which includes changes/updates based on the received event information.

When an event is requested for a control on a window, the server sends the entire frame buffer data for all the controls/widgets for the window based on the X, Y position data and the W, H (width and height) values of each respective rectangular area within a window or GUI. As a result, when a subsequent event occurs on the same window, LFRA 226 checks the local data store for the frame buffer data based on the X, Y, W, H data, and fetches the required data from the local store. When the required event frame buffer data is fetched from the local data-store, network traffic is reduced compared to when event frame buffer data is obtained from a remote server following detection of an event.

As a consequence of frame buffer servicing using local storage, a user experiences a faster and smoother GUI experience. Network bandwidth is saved as flows related to mouse event requests or control/widget event requests over the network are reduced. Faster GUI rendering on the screen occurs in response to event requests, providing an enhanced user experience.

Figure 6:
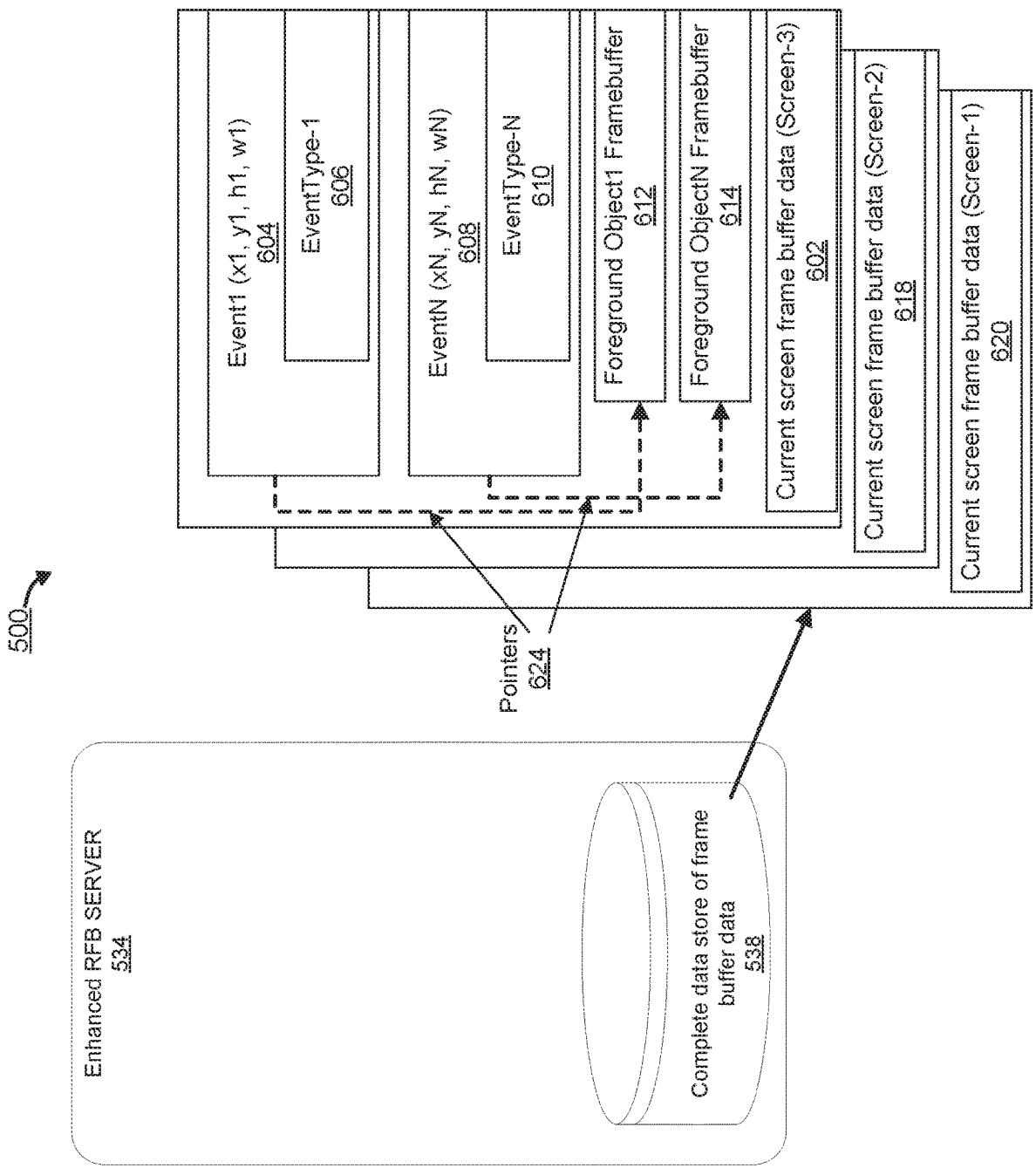
FIG. 6 is block diagram illustrating the remote server with a complete data-store of frame buffer data, according to one embodiment.

FIG. 6 is a block diagram illustrating operations within environment 500 in which the remote server has a complete data-store of frame buffer data. FIG. 6 provides a further detailed view of "complete data store of frame buffer data" 538 (which is referred to herein as frame buffer data 538) on RFB server 534. Frame buffer data 538 comprises frame buffer data corresponding to entire sets of associated events for the multiple screens (e.g., screens 1-3), respectively.

As illustrated in FIG. 6, "current screen frame buffer data (screen-3)" 602 comprises event1 604, eventN 608, foreground object1 frame buffer 612 and foreground objectN frame buffer 614. Event1 604 includes eventtype-1 606, and eventN 608 includes eventtype-N 610. Also illustrated in FIG. 6 are pointers 624. Relevant frame buffer data is retrieved by a callback handler function using a pointer (e.g., pointers 624). RFB server similarly stores frame buffer data 620 and 618 for screens 1 and 2.

Figure 7:
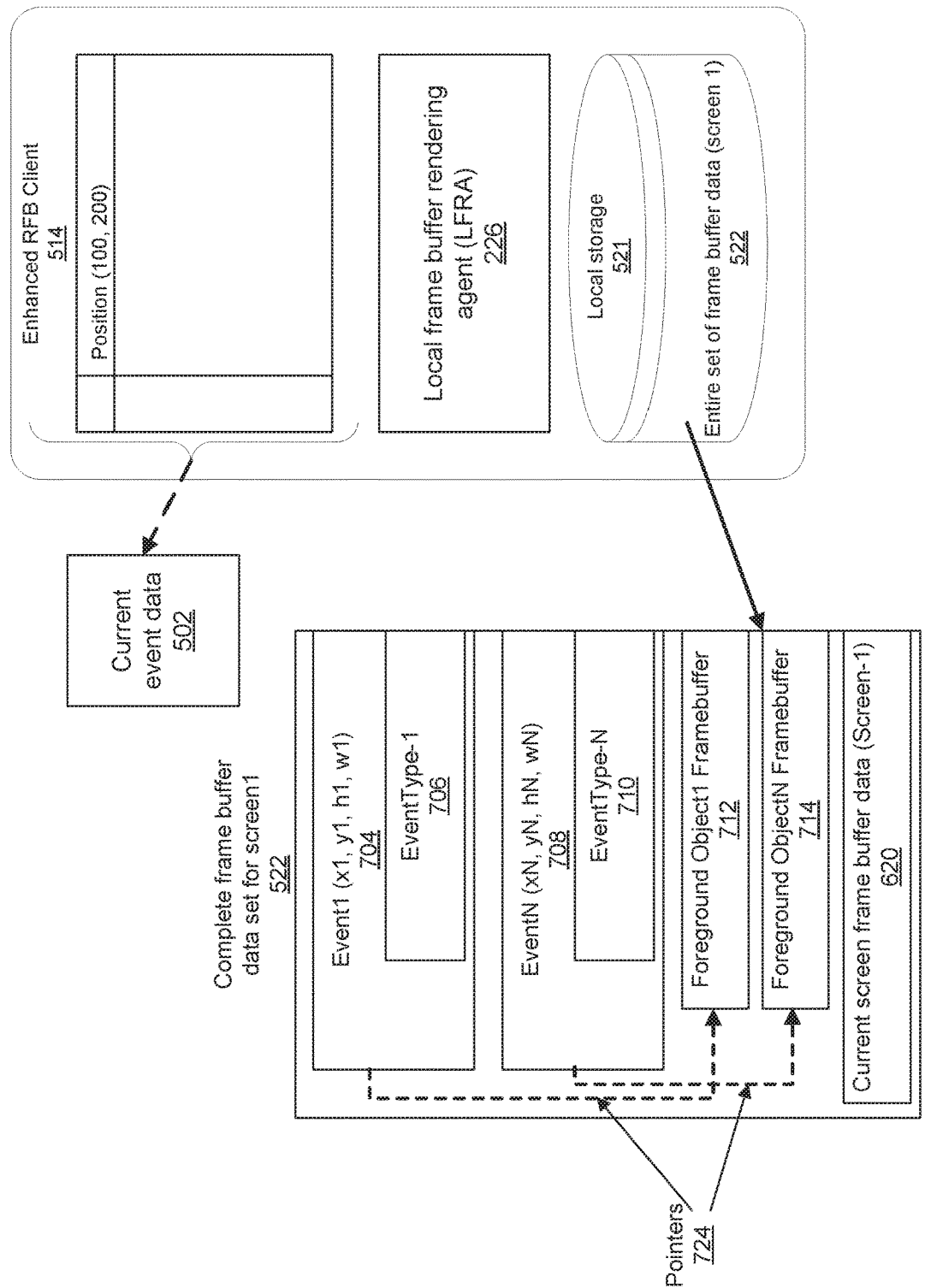
FIG. 7 is a block diagram illustrating a client having frame buffer data for an initial GUI and subsequent GUI changes, according to one or more embodiments.

FIG. 7 is a block diagram illustrating specific aspects of environment 500 in which a client has frame buffer data for an initial GUI and subsequent GUI changes, according to one or more embodiments. FIG. 7 further provides a detailed view of "complete frame buffer data set" 522 (which is referred to herein as frame buffer data 522) on RFB client 514. Frame buffer data 522 comprises frame buffer data corresponding to an entire set of associated events for screen1.

As illustrated in FIG. 7, "current screen frame buffer data (screen-1)" 620 comprises event1 704, eventN 708, foreground object1 frame buffer 712 and foreground objectN frame buffer 714. Event1 704 includes eventtype-1 706, and eventN 708 includes eventtype-N 710. Also illustrated in FIG. 7 are pointers 724. Relevant frame buffer data is retrieved by a callback handler function using a pointer (e.g., pointers 724).

Figure 8:
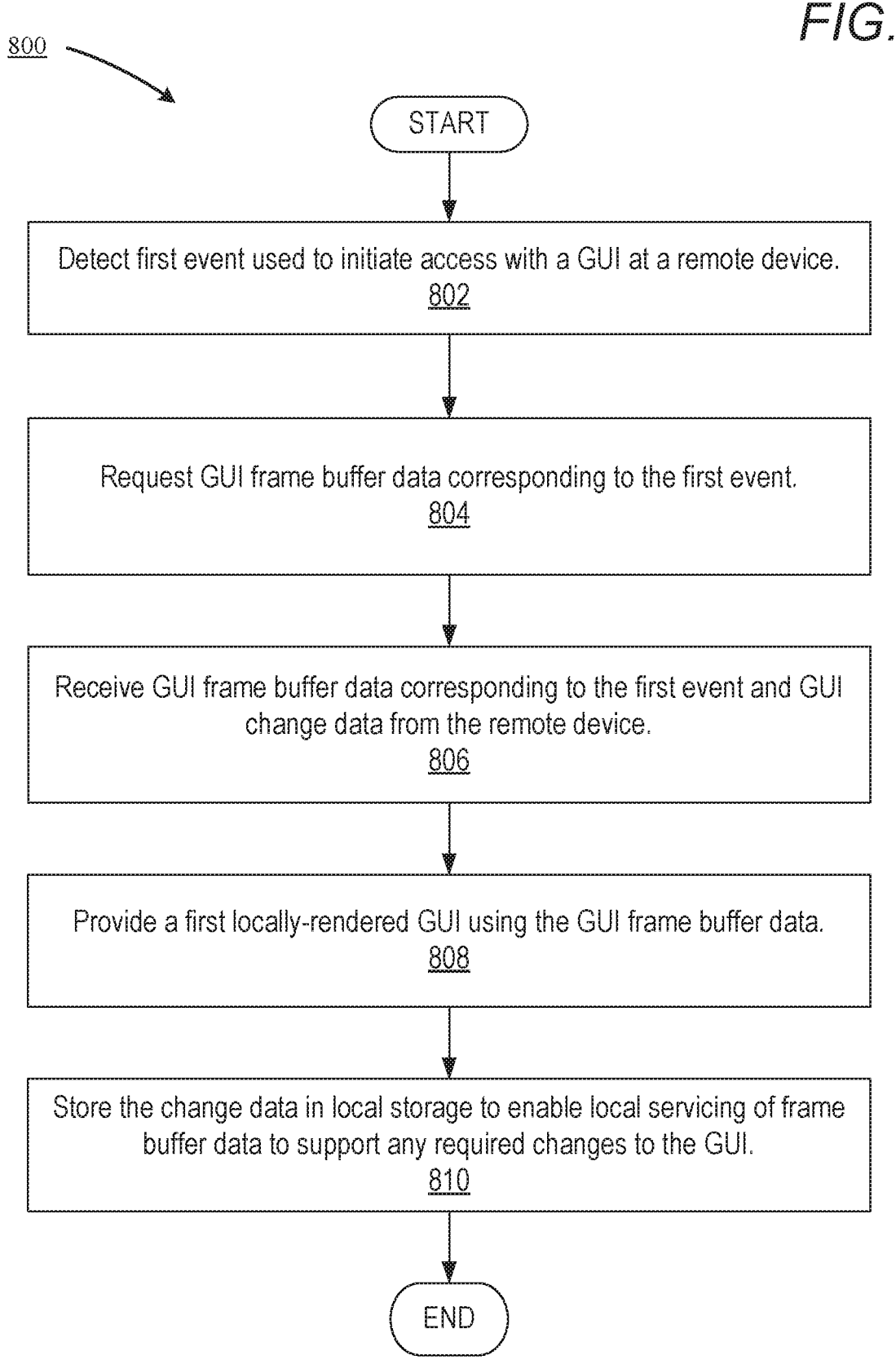
FIG. 8 is a flow chart illustrating a method for obtaining GUI data and GUI change data from a remote device, according to one embodiment.
Figure 9:
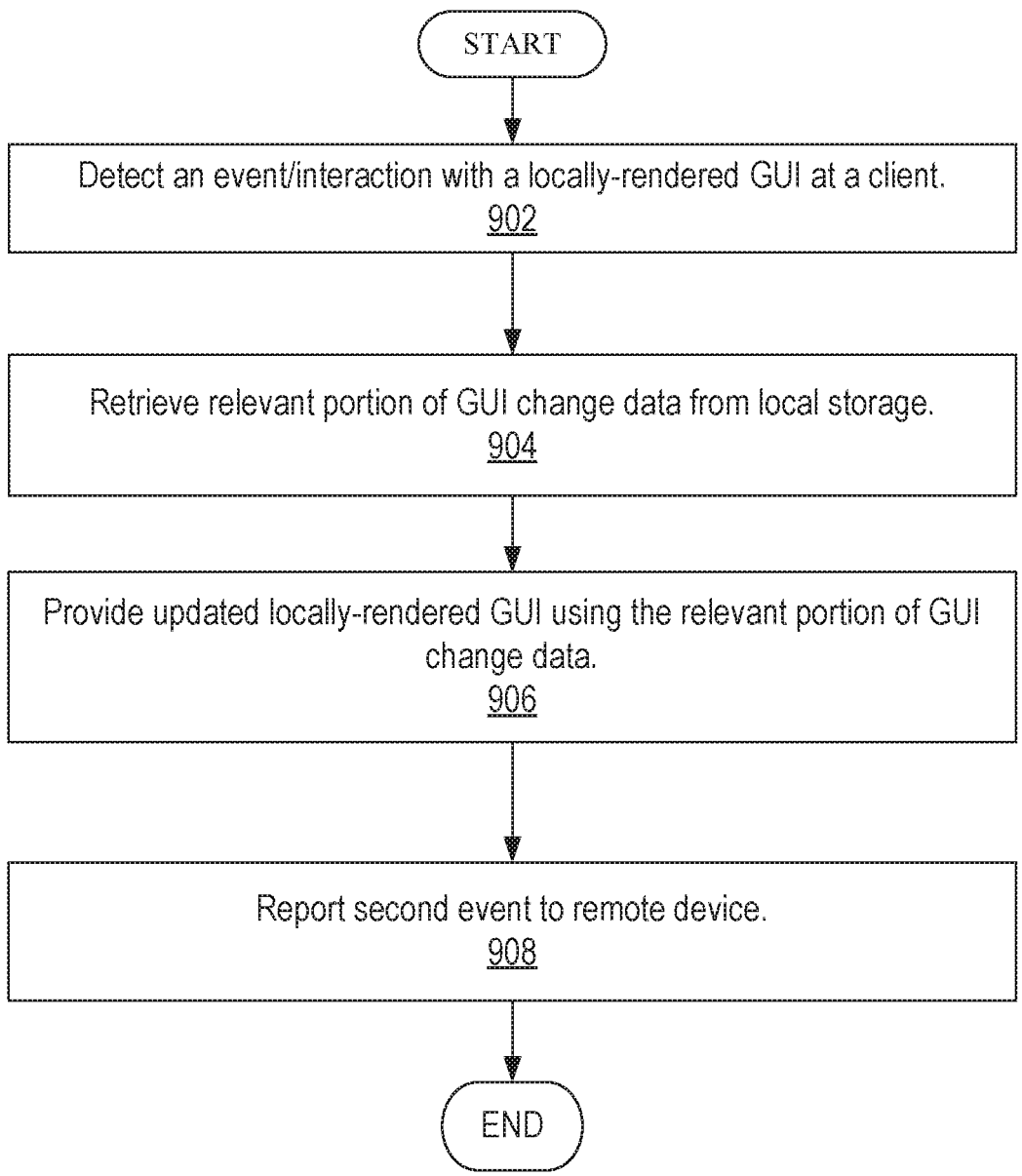
FIG. 9 is a flow chart illustrating a method for updating a locally-rendered GUI using locally stored GUI change data, according to one embodiment.
Figure 10:
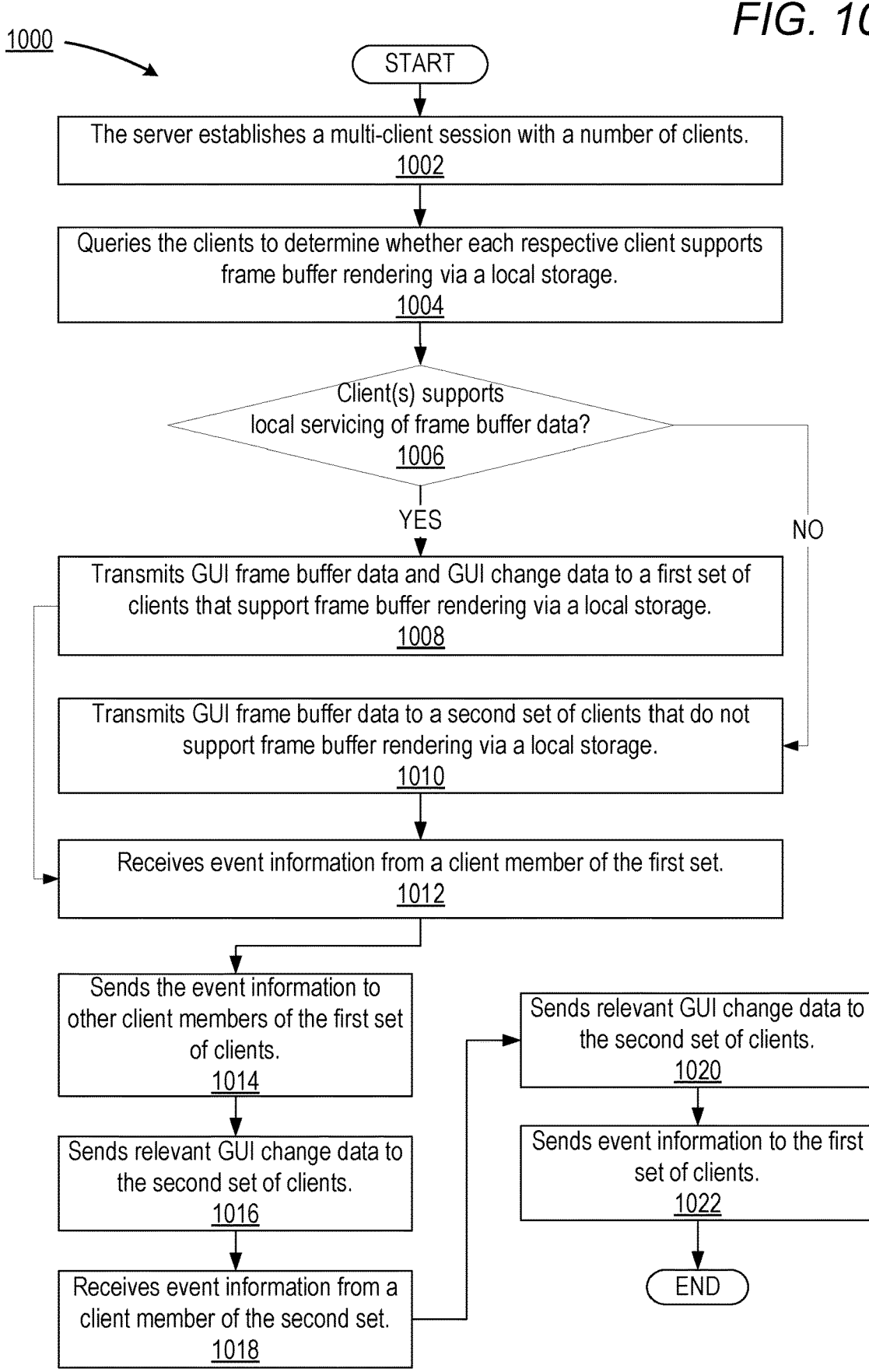
FIG. 10 is a flow chart illustrating a method for providing frame buffer data and change event data to clients within a multi-client session, according to one embodiment.

FIGS. 8-10 present flowcharts illustrating example methods by which IHS 100, and specifically, interface controller 135/224 and local frame buffer rendering agent (LFRA) 226 presented within the preceding figures, perform different aspects of the processes that enable one or more embodiments of the disclosure. Method 800 represents a method for obtaining GUI data and GUI change data from a remote device. Method 900 represents a method for updating a locally-rendered GUI using locally-stored GUI change data. Method 1000 represents a method for providing frame buffer data and change event data to clients within a multi-client session. The description of each method is provided with general reference to the specific components illustrated within the preceding figures. It is appreciated that certain aspects of the described methods may be implemented via other processing devices and/or execution of other code/firmware. In the discussion of FIGS. 8-10, reference is also made to elements described in FIGS. 1-7.

Method 800 begins at the start block and proceeds to block 802 at which interface controller 224 detects a first event used to initiate access with a GUI at a remote device. Controller 224 requests GUI frame buffer data corresponding to the first event and GUI change data from the remote device (block 804). Controller 224 receives GUI frame buffer data corresponding to the first event and GUI change data from the remote device (block 806). Controller 224 provides a first locally-rendered GUI using the GUI frame buffer data (block 808). Controller 224 stores the GUI change data in local storage to enable local servicing of frame buffer data to support any required changes to the locally-rendered GUI (block 810). The process concludes at the end block.

Method 900 begins at the start block and proceeds to block 902 at which controller 224 detects an event/interaction at a locally-rendered GUI on a client. Controller 224 retrieves a relevant portion of GUI change data from local storage, based on the specific event/interaction detected (block 904). Controller 224 provides an updated locally-rendered GUI using the relevant portion of GUI change data (block 906). Controller 224 reports the event to the remote device (block 908). In one or more embodiments, the remote device uses the reported event information to provide updates to locally-rendered GUIs at other clients within a multi-client session. The process concludes at the end block.

Method 1000 begins at the start block and proceeds to block 1002 at which controller 206/frame buffer module 212 residing on a server establishes a multi-client session with a number of clients. Controller 206 queries the various clients and receives feedback from/associated with each client regarding whether the client supports frame buffer rendering (block 1004). At decision block 1006, controller 206 evaluates the received responses and determines whether each respective client supports frame buffer rendering via a local storage. In response to a client supporting frame buffer rendering, controller categorizes the clients in a first set of clients, and uses this established categorization to transmit GUI frame buffer data and GUI change data to a first set of clients that support frame buffer rendering via a local storage (block 1008). However, for those clients that do not support frame buffer rendering via a local storage, as determined at decision block 1006, controller 206 categorizes those clients in a second set of clients, and controller 206 uses this established categorization to transmit only GUI frame buffer data to a second set of clients that do not support frame buffer rendering via a local storage (block 1010). Controller 206 receives event information from a client member of the first set (block 1012). Controller 206 sends the event information to other client members of the first set of clients (block 1014). Controller 206 sends the relevant GUI change data to the second set of clients (block 1016). Controller 206 receives event information from a client member of the second set (block 1018). Controller 206 sends relevant GUI change data to the second set of clients (block 1020). Controller 206 sends event information to the first set of clients (block 1022). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A client information handling system (IHS) comprising:
   an input/output (I/O) controller;
   an interface controller coupled to the I/O controller and having a local frame buffer rendering agent that supports frame buffer servicing via local storage of the client IHS, and which:
      detects a first event corresponding to a first interaction which is used to initiate access to a target graphical user interface (GUI) located at a remote device having one or more application GUIs;
      requests, from the remote device, GUI frame buffer data corresponding to the first event;
      receives GUI frame buffer data and a first set of GUI change data in response to the request for the GUI frame buffer data, the first set of GUI change data corresponding to GUI changes that can be initiated by interaction with a locally-rendered GUI corresponding to the target GUI;

in response to receiving the GUI frame buffer data, provides, using the GUI frame buffer data, the locally-rendered GUI corresponding to the target GUI; and in response to receiving the first set of GUI change data, stores the first set of GUI change data in local storage to enable local servicing of frame buffer data to support GUI changes which can occur as a result of subsequent interactions with the locally rendered GUI of the client IHS.

2. The IHS of claim 1, wherein:
said first interaction is provided by a first client;
said targeted GUI is shared by multiple clients in a multi-client session; and
the remote device sends copies of the GUI frame buffer data to each of the multiple clients to provide each client with a respective, locally-rendered GUI.

3. The IHS of claim 2, wherein the controller:
receives indication of a second event at a locally-rendered GUI; and
provides an updated locally-rendered GUI, triggered by the second event, by using a first portion of the first set of change data from local storage, the first portion corresponding to the second event interaction.

4. The IHS of claim 3, wherein the interface controller:
stores a pre-established mapping of associations between events data and GUI change data;
identifies the first, relevant portion of the first set of GUI change data corresponding to the second event by using corresponding event information to identify matching event information within the stored pre-established mapping data; and
retrieves the first, relevant portion of GUI change data used to provide an update to the locally-rendered GUI.

5. The IHS of claim 3, wherein:
said second event is provided by the first client via the first locally-rendered GUI;
the controller transmits event data corresponding to the second event to the remote device which uses the event data to provide updates to locally-rendered GUIs of respective clients;
the multiple clients comprise a first group of clients that supports frame buffer servicing via respective local storages and a second group of clients that do not support frame buffer servicing via a local storage; and
in response to receiving the event data that was transmitted, the remote server forwards (i) the received event data to remaining clients of the first group of clients and (ii) corresponding GUI change data to the second group of clients, in order to provide a respective updated, locally-rendered GUI.

6. The IHS of claim 3, wherein:
receives from the remote server second event information corresponding to said second event;
said second event information is associated with interaction provided by a second client via a second locally-rendered GUI, wherein the second client does not support frame buffer servicing via a local storage;
the second client requests, from the remote device, GUI change data corresponding to the second event information; and
in response to receiving the request for GUI change data from the second client, the remote device forwards (i) said second event data to a first group of clients that support frame buffer servicing via a local storage and (ii) corresponding GUI change data to remaining clients of the second group of clients that do not support frame buffer servicing via a local storage in order to provide a respective updated locally rendered GUI.

7. The IHS of claim 3, wherein the controller:
receives from the remote device a query to determine whether the first client supports frame buffer servicing via a local storage;
wherein the remote device sends queries to the multiple clients to determine which clients support frame buffer servicing via a local storage; and classifies clients within a respective one of (i) a first group of clients that support frame buffer servicing via a local storage and (ii) a second group of clients that do not support frame buffer servicing via a local storage.

8. The IHS of claim 1, wherein the controller:
in response to interactions received via a respective input device, identifies a corresponding event using event information that defines event attributes including one or more of: (i) an event type; (ii) a corresponding x-axis and y-axis position; (iii) a targeted control area; (iv) a targeted widget; and (v) a mask for a targeted control widget; and
retrieves, from local storage, a portion of GUI change data corresponding to the event information.

9. The IHS of claim 1, wherein the controller:
detects interactions associated with changes within the locally-rendered GUI to one or more of: (i) a foreground; (ii) a background; (iii) a control widget and (iv) a color corresponding to a targeted region.

10. In a client information handling system (IHS), a processor-implemented method comprising:
detecting a first event corresponding to a first interaction which is used to initiate access to a graphical user interface (GUI) located at a remote device having one or more application GUIs;
requesting, from the remote device, GUI frame buffer data corresponding to the first event;
receiving GUI frame buffer data and a first set of GUI change data in response to requesting the GUI frame buffer data, the first set of GUI change data corresponding to GUI changes that can be initiated by interaction with a locally-rendered GUI corresponding to the target GUI;
in response to receiving the GUI frame buffer data, provides, using the GUI frame buffer data, a first locally-rendered GUI corresponding to the target GUI; and
in response to receiving the first set of GUI change data, stores the first set of change data in local storage to enable local servicing of frame buffer data to support GUI changes which can occur as a result of subsequent interactions with the locally rendered GUI of the client IHS.

11. The method of claim 10, wherein:
said first interaction is provided by a first client;
said targeted GUI is shared by multiple clients in a multi-client session; and
the remote device sends copies of the GUI frame buffer data to each of the multiple clients to provide each client with a respective, locally-rendered GUI.

12. The method of claim 11, further comprising:
receiving indication of a second event at a locally-rendered GUI; and
providing an updated locally-rendered GUI, triggered by the second event, by using a first portion of the first set of change data from local storage, the first portion corresponding to the second event interaction.

13. The method of claim 12, further comprising:
storing a pre-established mapping of associations between events data and GUI change data; and
identifying a first, relevant portion of GUI change data corresponding to the second event by using corresponding event information to identify matching event information within the stored pre-established mapping data;
retrieving the first, relevant portion of GUI change data which is used to provide an update to the locally-rendered GUI.

14. The method of claim 12, wherein said second event is provided by the first client via the first locally-rendered GUI, the method further comprising:
transmitting event data corresponding to the second event to the remote device which uses the event data to provide updates to locally-rendered GUIs of respective clients;
wherein the multiple clients comprise a first group of clients that supports frame buffer servicing via respective local storages and a second group of clients that do not support frame buffer servicing via a local storage, and in response to receiving the event data that was transmitted, the remote server forwards (i) the received event data to a remaining clients of the first group of clients and (ii) corresponding GUI change data to the second group of clients, in order to provide a respective updated, locally-rendered GUI.

15. The method of claim 12, further comprising:
receiving from the remote server second event information corresponding to said second event;
wherein: said second event information is associated with interaction provided by a second client via a second locally-rendered GUI, wherein the second client does not support frame buffer servicing via a local storage; the second client requests, from the remote device, GUI change data corresponding to the second event information; and in response to receiving the request for GUI change data from the second client, the remote device forwards (i) said second event data to a first group of clients that support frame buffer servicing via a local storage and (ii) corresponding GUI change data to remaining clients of the second group of clients that do not support frame buffer servicing via a local storage in order to provide a respective updated locally rendered GUI.

16. The method of claim 12, further comprising:
receiving from the remote device a query to determine whether the first client supports frame buffer servicing via a local storage;
wherein the remote device sends queries to the multiple clients to determine which clients support frame buffer servicing via a local storage; and classifies clients within a respective one of (i) a first group of clients that support frame buffer servicing via a local storage and (ii) a second group of clients that do not support frame buffer servicing via a local storage.

17. The method of claim 10, further comprising:
in response to interactions received via a respective input device, identifying a corresponding event using event information that defines event attributes including one or more of: (i) an event type; (ii) a corresponding x-axis and y-axis position; (iii) a targeted control area; (iv) a targeted widget; and (v) a mask for a targeted control widget; and
retrieving, from local storage, a portion of GUI change data corresponding to the event information.

18. The method of claim 10, further comprising:
detecting interactions associated with changes within the locally-rendered GUI to one or more of: (i) a foreground; (ii) a background; (iii) a control widget and (iv) a color corresponding to a targeted region.

19. An information handling system comprising:
a controller having: memory which includes a frame buffer module; a processor coupled to memory;
a storage which includes frame buffer data for one or more application GUIs;
wherein the processor executes the frame buffer module to enable the controller to:
establish a multi-client session with a number of clients;
query the clients to determine whether each respective client supports frame buffer rendering via a local client storage;
transmit GUI frame buffer data and GUI change data to a first set of clients that support frame buffer rendering via the local client storage of a respective client; and
transmit only GUI frame buffer data to a second set of clients that do not support frame buffer rendering via a local client storage.

20. The IHS of claim 19, wherein the controller:
receives event information from a client member of the first set;
sends the event information to other client members of the first set and relevant GUI change data to the second set of clients;
receives event information from a client member of the second set; and
sends relevant GUI change data to the second set of clients and event information to the first set of clients.

* * * * *